United States Patent
Hongal et al.

(10) Patent No.: US 7,701,936 B2
(45) Date of Patent: Apr. 20, 2010

(54) OBTAINING PATH INFORMATION RELATED TO A BRIDGED NETWORK

(75) Inventors: Thippanna Hongal, San Jose, CA (US); Sethuraman N. Rao, Saratoga, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1453 days.

(21) Appl. No.: 10/925,624

(22) Filed: Aug. 25, 2004

(65) Prior Publication Data

US 2005/0053006 A1    Mar. 10, 2005

Related U.S. Application Data

(60) Provisional application No. 60/500,637, filed on Sep. 5, 2003.

(51) Int. Cl.
    H04L 12/28    (2006.01)
(52) U.S. Cl. .................. 370/390; 370/392; 370/400
(58) Field of Classification Search .............. 370/390, 370/392, 400
    See application file for complete search history.

(56) References Cited

U.S. PATENT DOCUMENTS

| | | | | |
|---|---|---|---|---|
| 6,707,814 | B1 * | 3/2004 | Ohgane | 370/389 |
| 7,266,296 | B2 * | 9/2007 | Ovadia et al. | 398/51 |
| 7,280,518 | B2 * | 10/2007 | Montano et al. | 370/338 |
| 2003/0189898 | A1 | 10/2003 | Frick et al. | |
| 2004/0037279 | A1 | 2/2004 | Zelig et al. | |
| 2004/0184407 | A1 * | 9/2004 | Pok et al. | 370/236 |
| 2004/0215758 | A1 * | 10/2004 | Kompella et al. | 709/223 |
| 2004/0246961 | A1 * | 12/2004 | Dai et al. | 370/392 |
| 2005/0169270 | A1 * | 8/2005 | Mutou et al. | 370/390 |

OTHER PUBLICATIONS

Lasserre, Mark, "Virtual Private LAN Services over MPLS", IETF draft-lasserre-vkompella-ppvpn-vpls-04.txt, Mar. 2003.
Kompella, K. "Virtual Private LAN Service", IETF draft-kompella-ppvpn-vpls-02.txt, May 2003.
Martini, Luca "Transport of Layer 2 Frames Over MPLS", IETF draft-martini-l2circuit-trans-mpls-09.txt, Apr. 2003.
Martini, Luca "Encapsulation Methods for Transport of Layer 2 Frames Over IP and MPLS Networks", IETF draft-martini-l2circuit-encap-mpls-04.txt, Nov. 2001.
Stokes, Olen, "Testing Hierarchical Virtual Private LAN Services", IETF draft-stokes-vkompella-ppvpn-hvpls-oam-02.txt, Jun. 2003.

* cited by examiner

*Primary Examiner*—Daniel J Ryman
*Assistant Examiner*—Jay P Patel
(74) *Attorney, Agent, or Firm*—Wilson & Ham (57) ABSTRACT

Path information is obtained in a bridged network by generating an L2 frame with a special MAC address in the header and a target MAC address embedded in the payload of the frame. The special MAC address in the header of the frame triggers the collection of path information as the frame traverses the bridged network while the target MAC address in the payload of the frame is used to forward the frame in the bridged network. In an embodiment, the destination MAC address of the frame is set to a special MAC address that identifies the frame as a "trace-path" frame, for example, a multicast MAC address.

27 Claims, 6 Drawing Sheets

OBTAINING PATH INFORMATION RELATED TO A BRIDGED NETWORK

CROSS REFERENCE TO RELATED APPLICATIONS

This application is entitled to the benefit of provisional U.S. Patent Application Ser. No. 60/500,637, filed 5 Sep. 2003.

FIELD OF THE INVENTION

The invention relates generally to network management, and more particularly, to a technique for obtaining path information related to a bridged network.

BACKGROUND OF THE INVENTION

To provide viable bridged (i.e., Layer 2) network services, it is desirable to be able to test the connectivity between nodes the in network. Two categories of testing functionality that are common in network management involve testing end-to-end connectivity between two nodes (often referred to as a "ping" test) and learning the path that traffic travels to get from one node to another (often referred to as a "traceroute" or "trace-path" test). Well-known "ping" and "traceroute" functionality has been developed for Layer 3 networks (e.g., IP-based networks). Although the ping and traceroute functions work well in IP-based networks, these functions are not exactly transferable to Layer 2 (L2) networks such as Ethernet networks. A solution for providing L2 ping functionality has been implemented and accepted by many L2 network equipment providers. The solution for providing L2 ping functionality involves designating a well-known EtherType (Etype) to indicate that an L2 frame is an operations, administration, and maintenance (OAM) frame. The OAM frame is sent to a target network node by setting the destination MAC address to the MAC address of the target network node. When the destination MAC address of the OAM frame matches the system MAC address of the receiving network node, the network node looks next at the Etype. If the Etype is set to the Etype that is designated for OAM frames, then the frame is pushed to an OAM task in the control plane of the network node, where the frame's specific function (e.g., L2 ping) is identified. Although there is general acceptance on how to test end-to-end connectivity (i.e., L2 ping), this approach has limitations when it comes to learning the path that an L2 frame has traversed to get from the source node to the target node. Specifically, an L2 ping frame is not pushed up to the OAM task until it reaches its target node and therefore there is no opportunity for the frame to collect path information at intermediate nodes.

In view of this, what is needed is a technique for obtaining path information related to a bridged network.

SUMMARY OF THE INVENTION

Path information is obtained in a bridged network by generating an L2 frame with a special MAC address in the header and a target MAC address embedded in the payload of the frame. The special MAC address in the header of the frame triggers the collection of path information as the frame traverses the bridged network while the target MAC address in the payload of the frame is used to forward the frame in the bridged network. In an embodiment, the destination MAC address of the frame is set to a special MAC address that identifies the frame as a "trace-path" frame. For example, the destination MAC address is set to a multicast MAC address, which is designated to identify the frame as a trace-path frame. In operation, when a frame is identified as a trace-path frame, the frame is pushed to the OAM task in the control plane of a receiving network node. The OAM task of the receiving network node then collects path information, embeds the collected path information into the trace-path frame, and uses the target MAC address in the frame's payload to identify the next hop of the trace-path frame. Once the trace-path frame reaches the target MAC address, all of the collected path information is sent back to the network node that generated the trace-path frame.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

Figure 1:
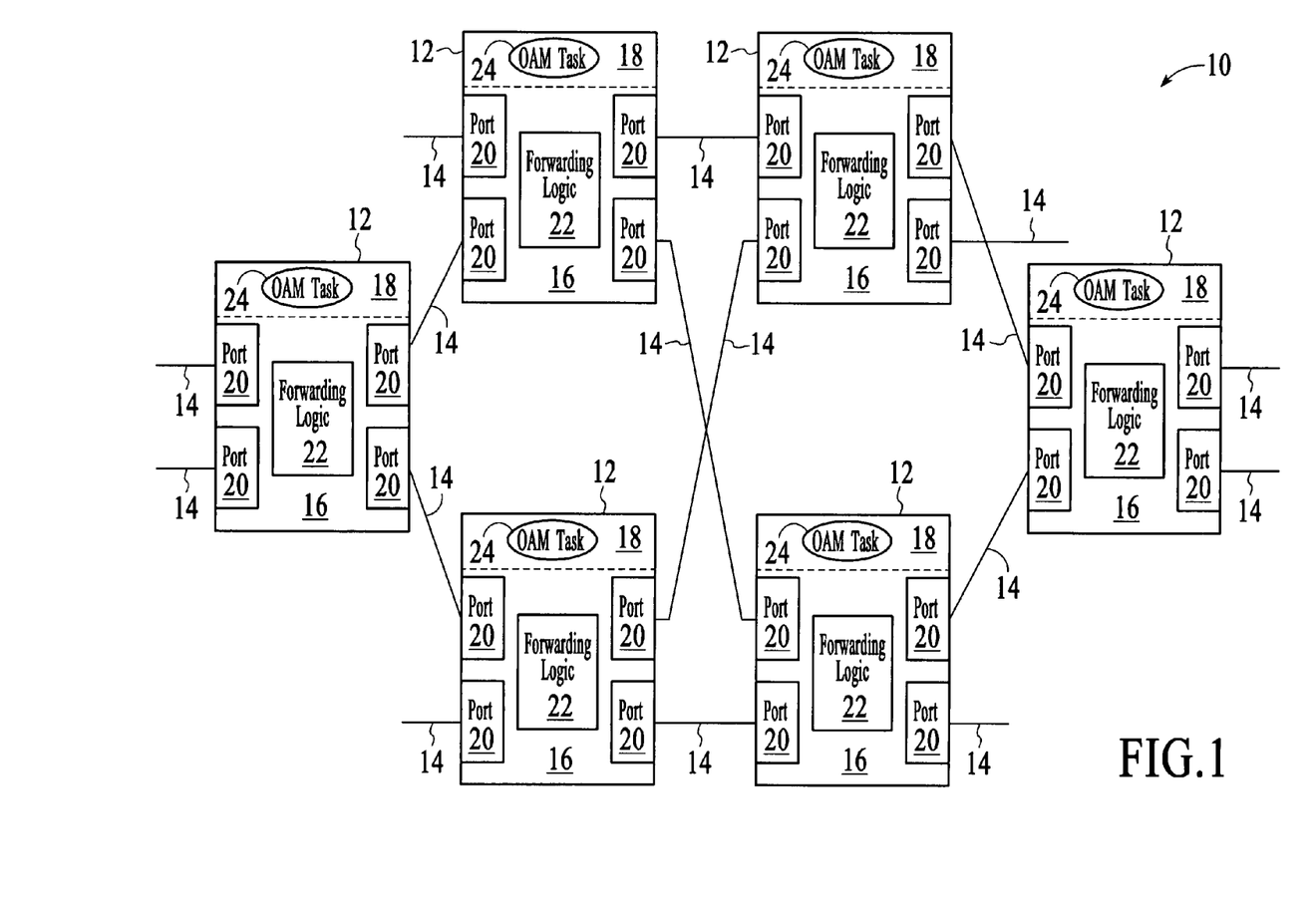
FIG. 1 depicts an example bridged network that includes multiple network nodes.

FIG. 1 depicts an example bridged, or Layer 2 (L2), network 10 that includes multiple network nodes 12. In the example of FIG. 1, the network is an Ethernet network although other L2 networking protocols could be used. The network "Layers" are described in the Open System Interconnection (OSI) model as defined by the International Standardization Organization (ISO). The network nodes depicted in FIG. 1 are connected by links 14 such as optical fibers or coaxial cable wires although other types of links, including wireless links are possible. As indicated by the dashed lines, the network nodes are logically divided, for description purposes, into a data plane 16 and a control plane 18. In general, the data plane is responsible for the frame operations and in particular, frame forwarding. The data plane includes ports 20 and forwarding logic 22. The ports are the input/output devices of the network node and support the physical exchange of data signals between nodes. The forwarding logic inspects frame headers and determines the ports on which the frames will be forwarded. The forwarding logic is often implemented with an application specific integrated circuit (ASIC), or ASICs.

The control plane 18 generally handles flow management tasks, higher-level protocol processing, and operations, administration, and maintenance (OAM) tasks. These tasks are typically implemented through a combination of a processor and task-specific software. The network nodes depicted in FIG. 1 include software for performing certain OAM functions, referred to herein generally as the "OAM task" 24. The OAM task is the only task depicted although it should be understood that these network nodes include additional tasks (e.g., task for implementing protocols such as the address resolution protocol (ARP), spanning tree protocol (STP), LACP, Filter Logic, VLAN translation logic, stacked VLAN logic, etc.). Although the data and control planes 16 and 18 are logically separate, the data and control plane functionality may be supported by common hardware (e.g., a processor such as an application specific processor or a network processor and memory).

Given the network architecture described with reference to FIG. 1 and in accordance with an embodiment of the invention, obtaining path information in a bridged network involves generating an L2 frame with a special MAC address in the header and a target MAC address embedded in the payload of the frame. The special MAC address in the header of the frame triggers the collection of path information as the frame traverses the bridged network while the target MAC address in the payload of the frame is used to forward the frame in the bridged network. In an embodiment, the destination MAC address of the frame is set to a special MAC address that identifies the frame as a "trace-path" frame. In a preferred embodiment, the destination MAC address is set to a multicast MAC address, which is designated to identify the frame as a trace-path frame. When a frame is identified as a trace-path frame, the frame is pushed to the OAM task in the control plane of a receiving network node. The OAM task of the receiving network node then collects path information and either forwards the trace-path frame (along with the embedded path information) to the next hop if the system MAC address of the receiving network node does not match the target MAC address in the payload of the trace-path frame or generates a frame that provides the collected path information to the originator network node if the system MAC address of the receiving network node matches the target MAC address in the payload of the trace-path frame.

Figures 2, 3:
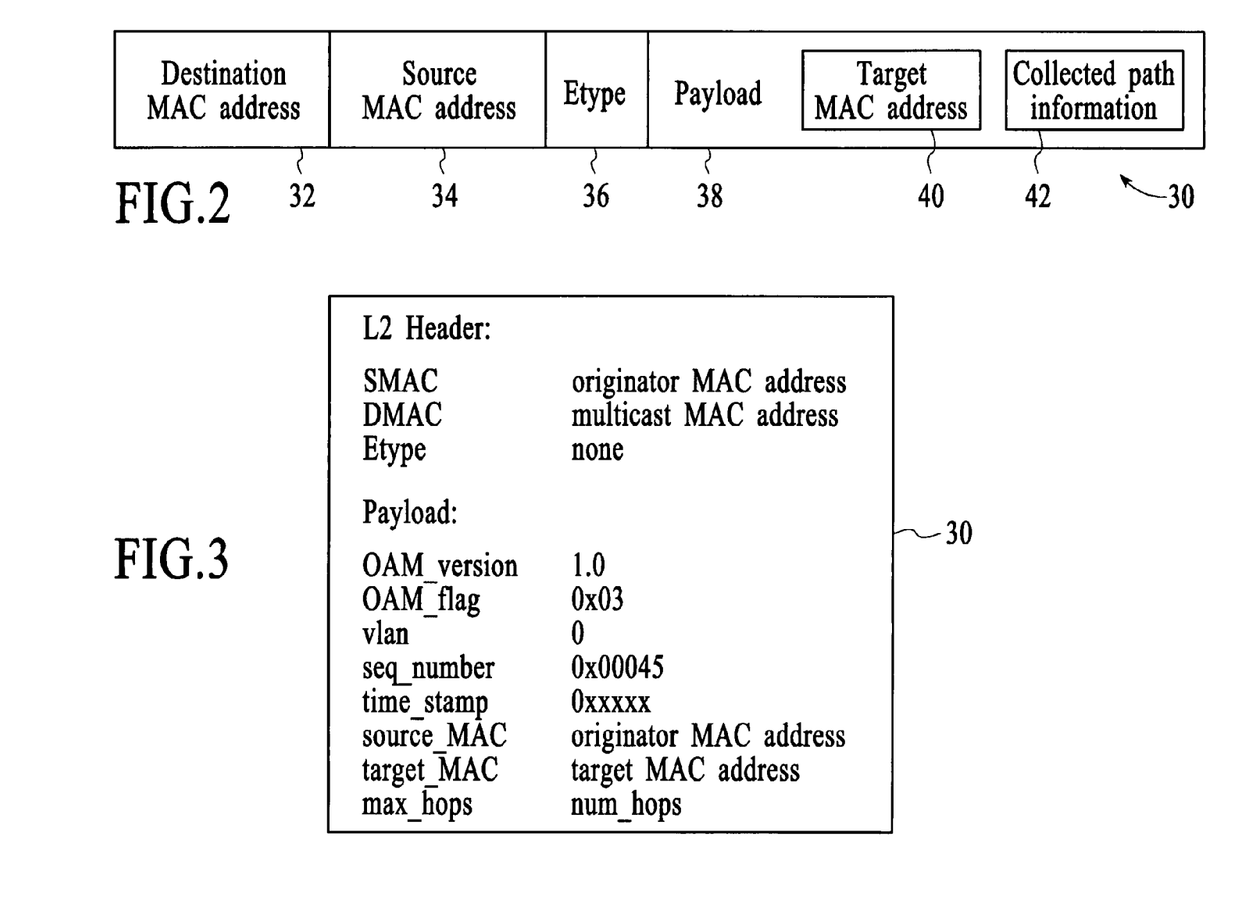
FIG. 2 depicts an example of a trace-path frame that is used to obtain path information in accordance with the invention.
FIG. 3 depicts an example of additional fields that may be included in the payload of the trace-path frame of FIG. 2.

FIG. 2 depicts an example of a trace-path frame 30 that is used to obtain path information. The trace-path frame has the frame format of an Ethernet frame and includes a destination MAC address 32, a source MAC address 34, an Etype 36, and a payload 38. In the example of FIG. 2, the destination MAC address is set to a special value, for example, a multicast address, which causes the frame to be pushed to the control plane of the receiving network node. In an embodiment, the multicast MAC address is selected from an original equipment manufacturer (OEM) pool that includes an OEM-specific organizationally unique identifier (OUI). The source MAC address is the MAC address of the originator network node (i.e., the network node at which the trace-path frame is generated). In this implementation, the Etype is not critical and can be set to any value. The payload includes the target MAC address 40, which identifies the target, or destination, network node of the trace-path frame and path information 42 that is collected as the trace-path frame traverses the bridged network. A trace-path frame typically does not include path information immediately upon being generated at the originator network node but collects path information as it traverses the bridged network. The path information can be carried in the frame's payload in a type-length-value (TLV) format and may include, for example, any combination of the system name (i.e., host name or customer defined name) of the network nodes, system MAC addresses, ingress ports, ingress VLAN IDs, egress ports, egress VLAN IDs, interface MAC addresses, STP states, and a mapping of system names to system MAC addresses.

FIG. 3 depicts an example of additional fields that may be included in the payload of a trace-path frame 30. The example fields include an OAM software version field (oam_version), an OAM flag field (oam_flag), a VLAN ID field (vlan), a sequence number field (seq_number), a timestamp field (time_stamp), a source MAC address field (source_mac), the target MAC address field (target_mac), and a maximum hops field (max_hops). The fields of the trace-path frame can be used to support the trace-path functionality as is described in more detail below.

Figure 4:
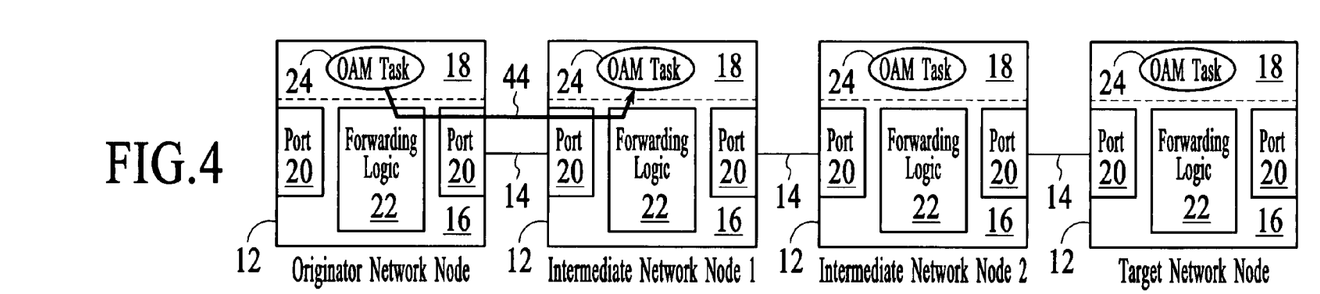
FIG. 4 depicts the hop of a trace-path frame from the originator network node to intermediate network node 1.

An example of the trace path functionality is described below with reference to FIGS. 4-11. In particular, the trace-path functionality is described on a hop-by-hop basis for the path that is traversed between an originator network node and a target network node. Initially, a trace-path frame is generated by the OAM task of the originator network node. The trace-path frame has its destination MAC address set to the designated multicast MAC address and the payload includes the MAC address of the target network node (referred to herein as the target MAC address). At this point, the payload does not include any path information because none has been collected. While in the control plane, the OAM task identifies the egress port of the trace-path frame based on the target MAC address in the frame's payload. The trace-path frame is then communicated from the control plane to the data plane where the frame is transmitted from the identified egress port of the originator network node. FIG. 4 depicts the hop (see line 44) of the trace-path frame from the originator network node to intermediate network node 1. At the data plane 16 of intermediate network node 1, the destination MAC address of the trace-path frame is inspected and identified as a destination MAC address that requires the frame to be pushed to the OAM task 24 in the control plane 18.

As indicated in FIG. 4, the trace-path frame is pushed from the data plane 16 of intermediate network node 1 to the OAM task 24 in the control plane 18. The OAM task looks at the OAM flag field to determine what type of OAM frame has been received. In this case, the OAM flag field is set to a value (e.g., 0x03) that identifies the frame as a trace-path frame. Upon identifying the frame as a trace-path frame, the OAM task checks to see if the target MAC address in the frame's payload matches the system MAC address of the network node (i.e., the system MAC address of intermediate network node 1). If the target MAC address in the frame's payload matches the system MAC address of the network node, then the trace-path frame has reached its intended destination and a "trace path reply process," which is described in detail below, is triggered. On the other hand, if the target MAC address in the frame's payload does not match the system MAC address of the network node, then the OAM task collects the desired path information and embeds the path information into the frame's payload. Additionally, the OAM task uses the target MAC address in the frame's payload to determine the egress port (i.e., the next hop) of the trace-path frame. For example, the target MAC address in the payload is used as a search key in an L2 lookup. In an embodiment, the L2 lookup is done on hardware table entries, which is very similar to the hardware lookups that are done "on the wire" (e.g., at the input port). Once the egress port is determined, the trace-path frame (which includes the newly collected path information) is transmitted from the egress port of intermediate network node 1.

Figure 5:
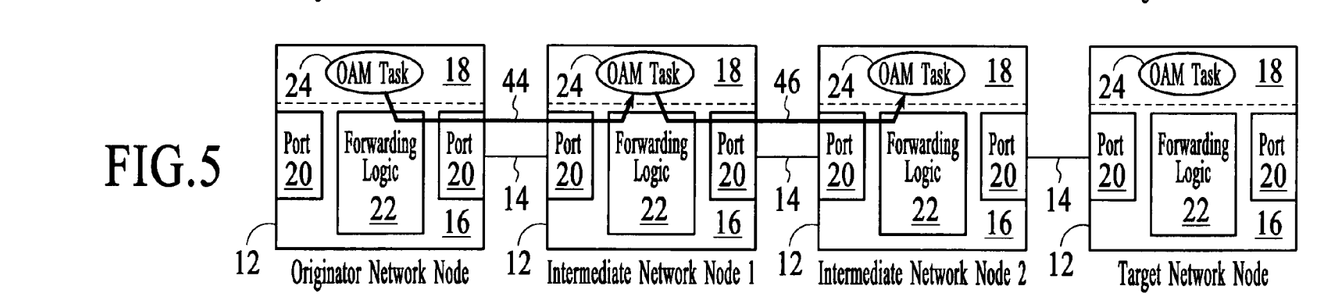
FIG. 5 depicts the hop of the trace-path frame from intermediate network node 1 to intermediate network node 2.

FIG. 5 depicts the hop (see line 46) of the trace-path frame from intermediate network node 1 to intermediate network node 2. Upon being received by intermediate network node 2, the destination MAC address of the trace-path frame is inspected at the data plane 16. In this example, the destination MAC address is identified as a destination MAC address that requires the frame to be pushed from the data plane to the OAM task 24 in the control plane 18 as indicated in FIG. 5. The OAM task of intermediate network node 2 processes the trace-path frame the same as the OAM task of intermediate network node 1. As with intermediate network node 1, the target MAC address in the trace-path frame's payload does not match the system MAC address of intermediate network node 2. Because the target MAC address in the trace-path frame's payload does not match the system MAC address of intermediate network node 2, path information is collected and embedded into the trace-path frame's payload. Additionally, the OAM task uses the target MAC address in the frame's payload to determine the egress port (i.e., the next hop) of the trace-path frame. Once the egress port is determined, the trace-path frame (which includes the newly collected path information along with the previously collected path information) is transmitted from the egress port of intermediate network node 2.

Figure 6:
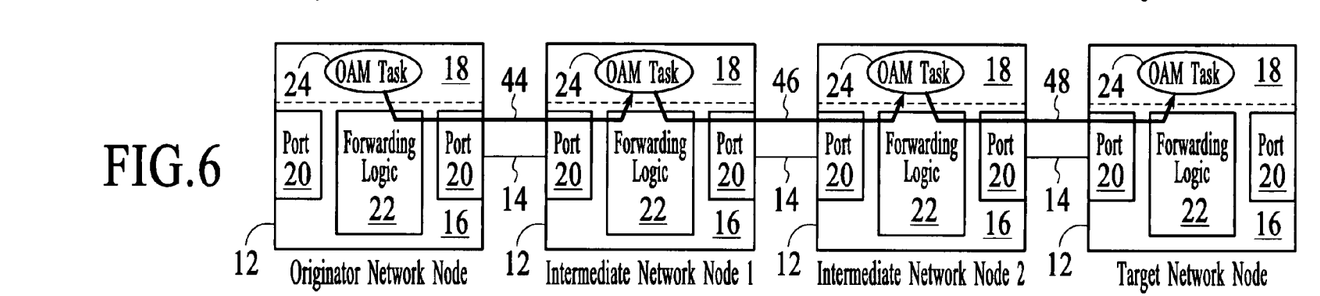
FIG. 6 depicts the hop of the trace-path frame from intermediate network node 2 to the target network node.

FIG. 6 depicts the hop (see line 48) of the trace-path frame from intermediate network node 2 to the target network node. Upon being received at the target network node, the destination MAC address of the trace-path frame is inspected at the data plane 16. In this example, the destination MAC address is identified as a destination MAC address that requires the frame to be pushed to the OAM task 24 in the control plane 18 as indicated by FIG. 6. The OAM task looks at the OAM flag field to determine what type of OAM frame has been received. Upon determining that the frame is a trace-path frame, the OAM task checks to see if the target MAC address in the frame's payload matches the system MAC address of the target network node. In this case, the target MAC address in the trace-path frame's payload does match the system MAC address of the target network node and therefore, the trace path reply process is triggered. The trace path reply process involves generating a "trace-path-reply" frame, which is used to carry the collected path information back to the originator network node. The trace path reply process is described in more detail below with reference to FIGS. 7-11.

Figure 7:
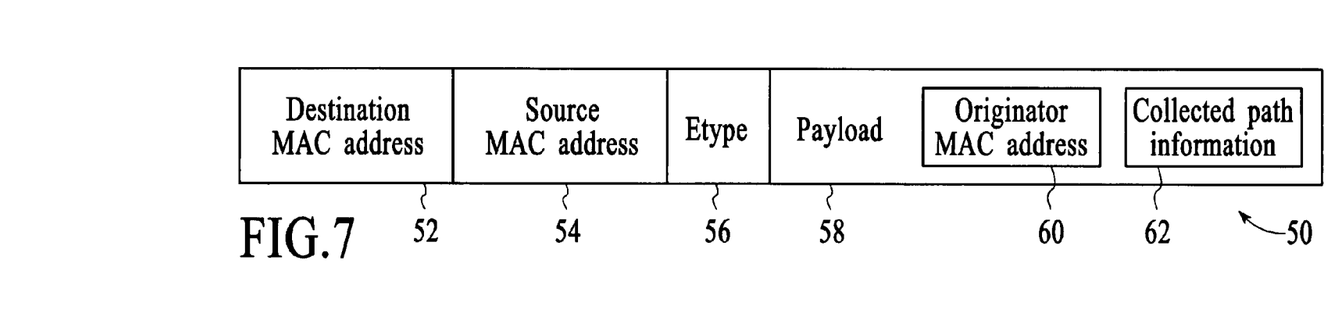
FIG. 7 depicts an example of a trace-path-reply frame that is used to communicate path information from a target network node back to an originator network node in accordance with the invention.

FIG. 7 depicts an example of a trace-path-reply frame 50 that is used to communicate path information from the target network node back to the originator network node. The trace-path-reply frame has the frame format of an Ethernet frame and includes a destination MAC address 52, a source MAC address 54, an Etype 56, and a payload 58. In the example of FIG. 7, the destination MAC address is set to a multicast MAC address that causes the trace-path-reply frame to be pushed to the OAM task at each hop. In an embodiment, the multicast MAC address that is used for the trace-path-reply frame is the same as the multicast MAC address that is used for the trace-path frame, although a different MAC address could be used. The source MAC address is set to the system MAC address of the target network node (i.e., the target MAC address). Again, the Etype is not critical and can be set to any value. The payload includes the originator MAC address 60 and the path information 62 that was collected as the corresponding trace-path frame traversed the bridged network. As is described below, the originator MAC address that is carried in the frame's payload is used to forward the trace-path-reply frame to the originator network node. In an alternative embodiment, the destination MAC address in the frame's header could be set to the originator MAC address. In this case, there should not be any filters on the return path that filter out the originator MAC address.

Figure 8:
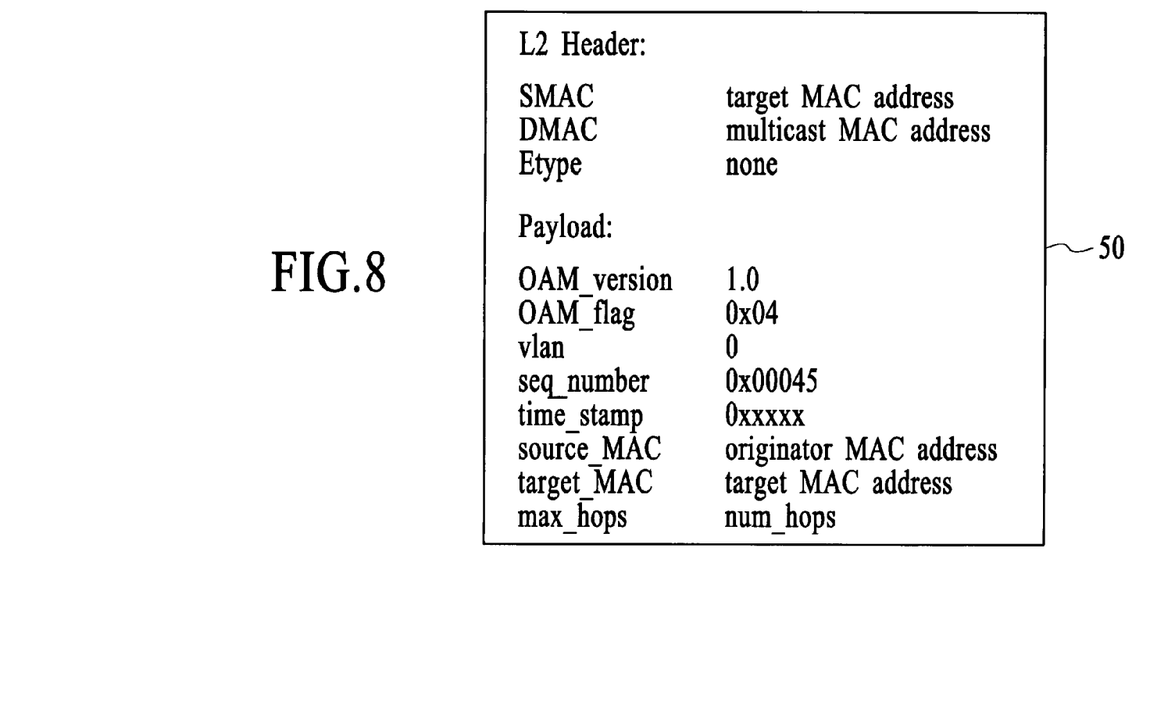
FIG. 8 depicts an example of additional fields that can be included in the payload of the trace-path-reply frame of FIG. 7.

FIG. 8 depicts an example of additional fields that can be included in the payload of a trace-path-reply frame 50. The example fields include an OAM version field (oam_version), an OAM flag field (oam_flag), a VLAN ID field (vlan), a sequence number field (seq_number), a timestamp field (time_stamp), a source MAC field (source_mac, which is the MAC address of the source of the original trace-path frame (i.e., the originator network node)), the target MAC address field (target_mac), and a maximum hops field (max_hops). The fields of the trace-path-reply frame can be used as is described below to support the trace path functionality.

Figure 9:
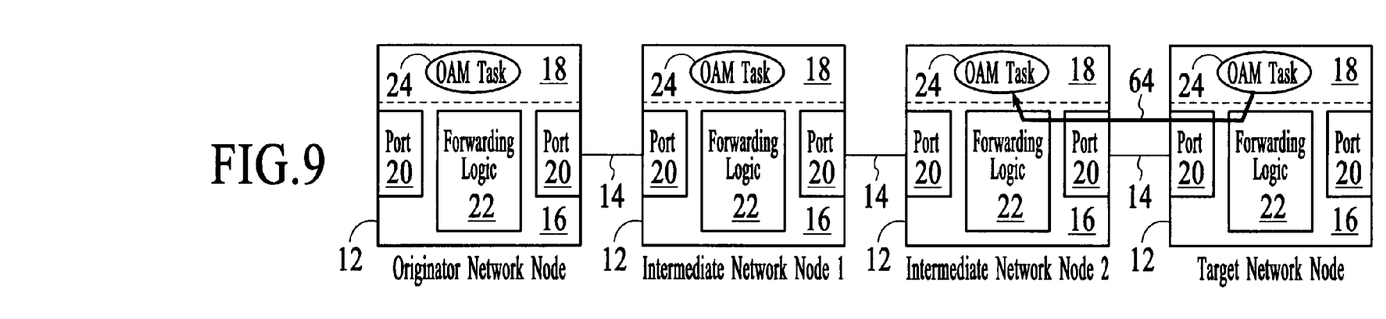
FIG. 9 depicts the hop of a trace-path-reply frame from the target network node to intermediate network node 2.
Figure 10:
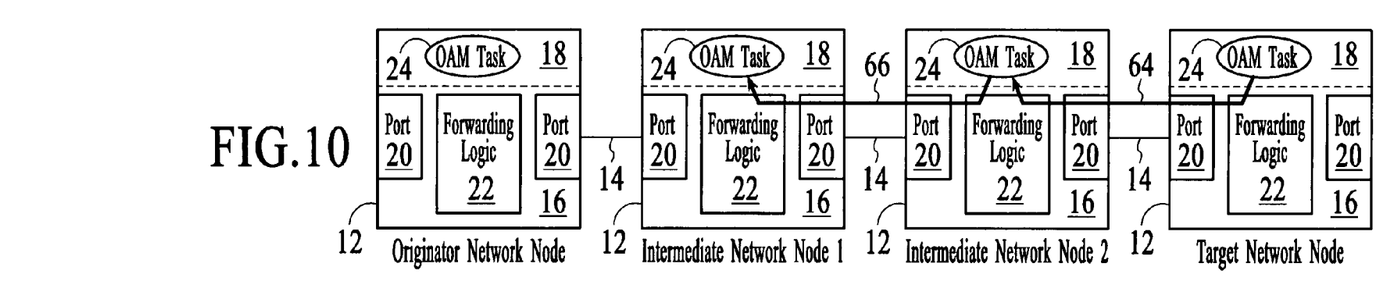
FIG. 10 depicts the hop of the trace-path-reply frame from intermediate network node 2 to intermediate network node 1.
Figure 11:
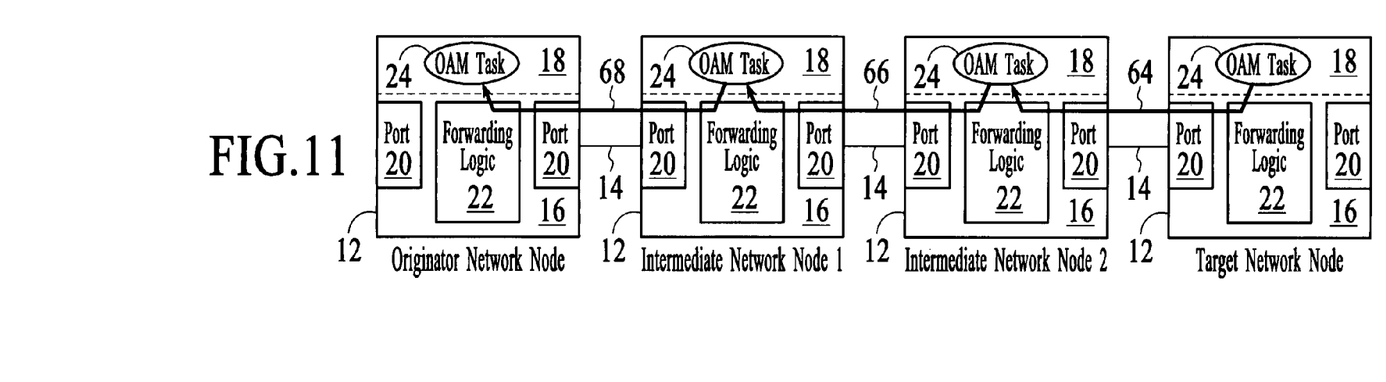
FIG. 11 depicts the hop of the trace-path-reply frame from intermediate network node 1 to the originator network node.

Transmission of the trace-path-reply frame is described on a hop-by-hop basis with reference to FIGS. 9-11. Once the trace path reply process is triggered, the OAM task of the corresponding network node builds a trace-path-reply frame and sets the fields that are described above with reference to FIGS. 7 and 8. The trace-path-reply frame is then sent out of the target network node through the port on which the corresponding trace-path frame was received. FIG. 9 depicts the hop 64 of the trace-path-reply frame from the target network node to intermediate network node 2. Upon being received at intermediate network node 2, the destination MAC address of the trace-path-reply frame is inspected at the data plane 16 and identified as a destination MAC address that requires the frame to be pushed to the OAM task 24 in the control plane 18. The OAM task looks at the OAM flag field of the trace-path-reply frame to determine what type of OAM frame has been received. In this case, an OAM flag value of 0x04 identifies the frame as a trace-path-reply frame. Upon determining that the frame is a trace-path-reply frame, the OAM task checks to see if the source MAC address (i.e., the source_mac or originator MAC address) in the payload matches the system MAC address of intermediate network node 2. Assuming in this case that the originator MAC address does not match the system MAC address of intermediate network node 2, the OAM task determines the egress port (i.e., the next hop) for the frame. In an embodiment, the OAM task looks at the path information in the trace-path-reply frame to determine the egress port. In particular, the OAM task searches the collected path information for a match of its own MAC address and then identifies the ingress port associated with its own MAC address. The OAM task then directs the trace-path-reply frame to be forwarded through the identified ingress port since this port is the port on which the corresponding trace-path frame arrived. In an embodiment, if the OAM task does not find a MAC address in the collected path information that matches its own system MAC address, then the trace-path-reply frame is not forwarded and the frame essentially dies at the network node. The above-described technique for forwarding the trace-path-reply frame provides a verification check that the trace-path-reply frame is following the proper return path. In an alternative embodiment, that does not provide a verification check, the trace-path-reply frame can be forwarded using an L2 lookup based on the originator MAC address.

FIG. 10 depicts the hop (see line 66) of the trace-path-reply frame from intermediate network node 2 to intermediate network node 1. Upon being received by intermediate network node 1, the destination MAC address of the trace-path-reply frame is inspected at the data plane 16 and identified as a destination MAC address that requires the frame to be pushed to the OAM task 24 in the control plane 18 as indicated in FIG. 10. The OAM task of intermediate network node 1 then processes the trace-path-reply frame the same as the OAM task of intermediate network node 2. Again, the trace-path-reply frame is transmitted from the port on which the corresponding trace-path frame was received.

FIG. 11 depicts the hop (see line 68) of the trace-path-reply frame from intermediate network node 1 to the originator network node. Upon being received by the originator network node, the destination MAC address of the trace-path-reply frame is inspected at the data plane 16 and identified as a destination MAC address that requires the frame to be pushed to the OAM task 24 in the control plane 18 as indicated in FIG. 11. At the control plane, the OAM task looks at the OAM flag field of the trace-path-reply to determine what type of OAM frame has been received. Upon determining that the frame is a trace-path-reply frame, the OAM task checks to see if the source MAC address (i.e., source_mac or originator MAC address) in the trace-path-reply frame's payload matches its system MAC address of the receiving network node. In this case, the originator MAC address matches the system MAC address of the receiving network node and the match triggers a verification step. In the verification step, the sequence number (seq_number) in the payload of the trace-path-reply frame is checked against the sequence number of the corresponding trace-path frame. If the sequence numbers match, this confirms that the trace-path-reply frame is the frame that was expected in response to the trace-path frame. The OAM task then retrieves the collected path information from the payload of the trace-path-reply frame. The collected path information can be used in various ways to support network operations.

Figure 12:
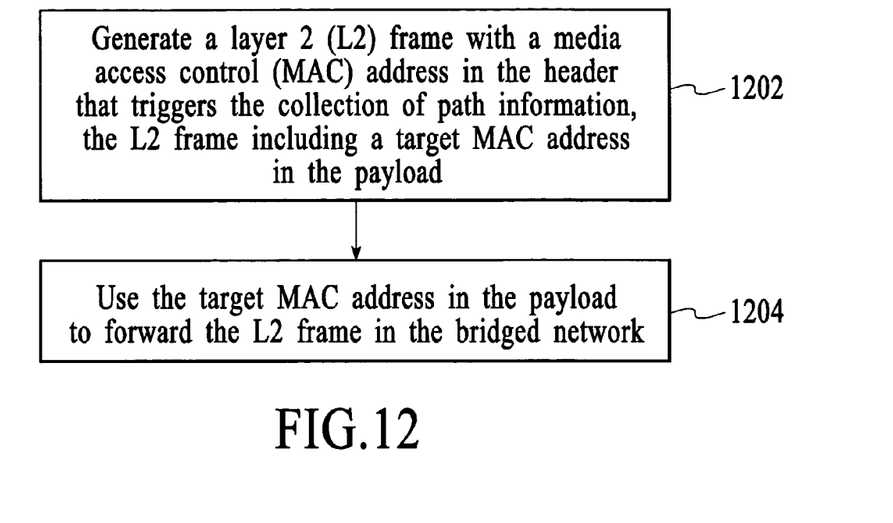
FIG. 12 is a process flow diagram of a method for obtaining path information related to a bridged network in accordance with the invention.

FIG. 12 is a process flow diagram of a method for obtaining path information related to a bridged network in accordance with the invention. At step 1202, a layer 2 (L2) frame is generated with a media access control (MAC) address in the header that triggers the collection of path information, the L2 frame including a target MAC address in the payload. At step 1204, the target MAC address in the payload is used to forward the L2 frame in the bridged network.

Figure 13:
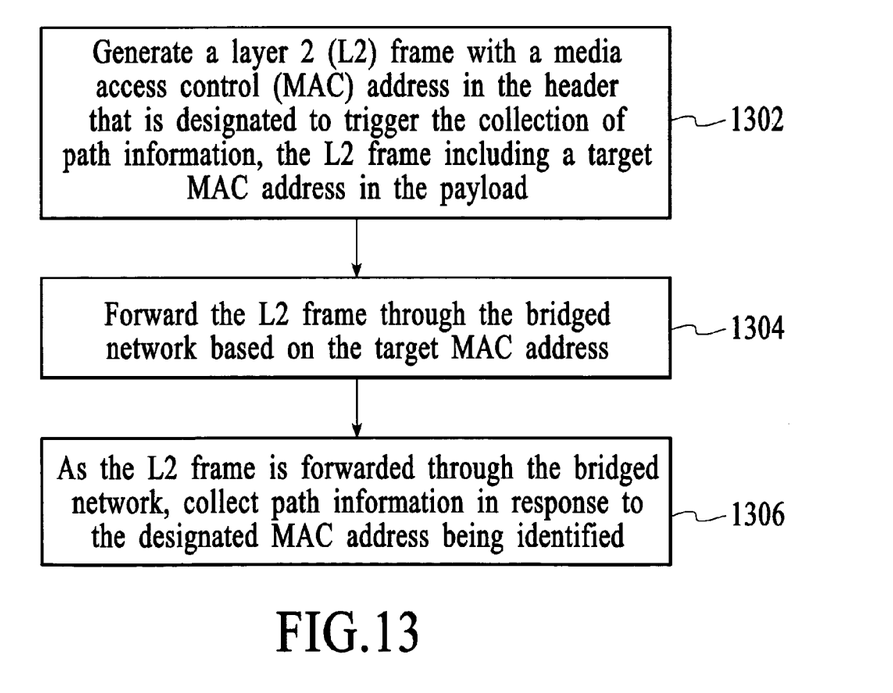
FIG. 13 is a process flow diagram of another method for obtaining path information related to a bridged network in accordance with the invention.

FIG. 13 is a process flow diagram of another method for obtaining path information related to a bridged network in accordance with the invention. At step 1302, a layer 2 (L2) frame is generated with a media access control (MAC) address in the header that is designated to trigger the collection of path information, the L2 frame including a target MAC address in the payload. At step 1304, the L2 frame is forwarded through the bridged network based on the target MAC address. At step 1306, as the L2 frame is forwarded through the bridged network, path information is collected in response to the designated MAC address being identified.

In an embodiment, the maximum hops field (max_hops) in the trace-path and trace-path-reply frames is used to control the distribution of the trace-path and trace-path-reply frames through a bridged network. In operation, the maximum hops field is decremented by one at every hop. If the max_hops value is zero after decrementing, then a frame is sent back to the source with an indication that the maximum number of hops has been exceeded.

If reaching the target MAC address requires a trace-path or a trace-path-reply frame to travel through a tunnel (e.g., an MPLS tunnel or a VLAN tunnel), then the trace-path or trace-path-reply frame is sent to the appropriate tunneling task, where the necessary tunnel frame is built. Additionally, although one Ethernet frame format is described herein, the trace-path and trace-path-reply frames may be implemented with other Ethernet formats such as the IEEE802.1q or "tagged VLAN" frame format.

In order for the trace path functionality to work, the network nodes in the bridged network must be configured to identify the special MAC address that indicates a trace-path or a trace-path-reply frame. When these frames are recognized, they are not forwarded by the forwarding logic in the data plane but are pushed to the OAM task in the control plane.

In an embodiment, if an L2 lookup by the OAM task fails to identify an egress port for a trace-path frame, then the trace-path frame could be forwarded to a pre-established list of ports or flood.

In one embodiment, the mapping of node name to system MAC address is distributed to other nodes so that users can refer to the network nodes using their node names rather that their system MAC addresses.

In an embodiment, the OAM task automatically pings (e.g., L2 ping) the network node with the target MAC address before a trace-path frame is sent. Pinging the target MAC address ensures the population of L2 entries that may have been previously aged out of the L2 forwarding tables.

Referring to FIGS. 3 and 8, the time_stamp field can be used to calculate the round-trip time for the trace-path and trace-path-reply frames.

In an embodiment, the "flood option" involves flooding trace-request frames to all ports of a transit network node when an L2 lookup fails. If the frame is associated with a VLAN, it will be flooded to all ports that are part of the VLAN.

The trace path functionality can be initiated at any service-aware node using remote network management techniques. For example, the trace-path functionality can be initiated using a command line interface (CLI) or SNMP.

As used herein, network "Layers" are defined by the Open System Interconnection (OSI) model as published by the International Standardization Organization (ISO).

Although specific embodiments of the invention have been described and illustrated, the invention is not to be limited to the specific forms or arrangements of parts as described and illustrated herein. The invention is limited only by the claims.

What is claimed is:

1. A method for obtaining path information related to a bridged network comprising:

at a network node that has multiple ports, receiving a layer 2 (L2) frame with a media access control (MAC) address in the header that triggers the collection of path information, the received L2 frame including a target MAC address in the payload; and at the network node, using the target MAC address in the payload to forward the received L2 frame in the bridged network, wherein using the target MAC address in the payload to forward the received L2 frame in the bridged network comprises using the target MAC address in the payload of the received L2 frame to determine from which of the multiple ports the received L2 frame will egress.

2. The method of claim 1 further comprising applying control plane processing to the received L2 frame in response to the MAC address in the header.

3. The method of claim 2 wherein the MAC address in the header is in the destination MAC address field.

4. The method of claim 3 wherein the MAC address in the header is a multicast MAC address.

5. The method of claim 1 further including collecting path information in response to the MAC address in the header and adding the collected path information to the payload of the received L2 frame.

6. The method of claim 5 wherein the collected path information includes a type-length value (TLV), which includes MAC address and ingress and egress port information.

7. The method of claim 1 further comprising pushing the received L2 frame to the control plane of a receiving network node upon recognizing the MAC address in the header.

8. The method of claim 1 further including embedding an originator MAC address in the payload of the received L2 frame and forwarding collected path information based on the originator MAC address once the target MAC address in the payload matches the MAC address of a receiving network node.

9. The method of claim 8 wherein forwarding the collected path information further comprises using the collected path information to determine an egress port.

10. The method of claim 1 wherein the MAC address in the header is a multicast destination MAC address.

11. The method of claim 1 further comprising pushing the received L2 frame to an OAM task upon recognizing the MAC address in the header.

12. A method for obtaining path information related to a bridged network comprising:
generating a layer 2 (L2) frame with a media access control (MAC) address in the header that is designated to trigger the collection of path information, the L2 frame including a target MAC address in the payload;
forwarding the L2 frame through multiple intermediate network nodes of the bridged network based on the target MAC address, wherein forwarding the L2 frame through multiple intermediate network nodes of the bridged network based on the target MAC address comprises:
at each of the intermediate network nodes, checking to see if the target MAC address in the payload of the L2 frame matches the MAC address of the particular intermediate network node; and
if the target MAC address in the payload of the L2 frame does not match the MAC address of the particular network node, then using the target MAC address in the payload of the L2 frame to determine from which port of the intermediate network node the L2 frame will egress; and
as the L2 frame is forwarded though multiple intermediate network nodes of the bridged network, collecting path information in response to the designated MAC address being identified.

13. The method of claim 12 wherein the designated MAC address in the header is located in the destination MAC address position.

14. The method of claim 12 wherein the designated MAC address is a multicast MAC address.

15. The method of claim 12 further including adding collected path information to the payload of the L2 frame.

16. The method of claim 12 wherein the forwarding of the L2 frame includes processing the L2 frame at a control plane in response to the designated MAC address being identified.

17. The method of claim 12 wherein the forwarding of the L2 frame includes identifying the next hop of the L2 frame based on the target MAC address from the payload of the L2 frame.

18. The method of claim 12 wherein the L2 frame is pushed to the control plane of a network device upon recognizing the designated MAC address.

19. The method of claim 12 wherein the payload of the L2 frame includes an originator MAC address, the method further comprising forwarding the collected path information to the originator MAC address once the target MAC address in he payload matches the MAC address of a receiving network device.

20. The method of claim 19 wherein forwarding the collected path information further comprises using the collected path information to determine an egress port.

21. A system for obtaining path information related to a bridged network comprising:
a hardware network node having:
forwarding logic; and
an operations, administration, and management (OAM) task;
the forwarding logic being configured to push a received Layer 2 (L2) frame to the OAM task in response to the destination media access control (MAC) address of the received L2 frame, wherein the received L2 frame includes a target MAC address in the payload; and
the OAM task being configured to collect path information, embed the collected path information into the payload of the received L2 frame, and forward the L2 frame in response to the target MAC address that is carried in the payload of the received L2 frame.

22. The system of claim 21 wherein the destination MAC address of the received L2 frame is a multicast MAC address.

23. The system of claim 21 wherein the collected path information includes MAC address, ingress port, and egress port information.

24. The system of claim 21 wherein the OAM task of a receiving network node is further configured to forward collected path information based on an originator MAC address in the payload of the L2 frame once the target MAC address in the payload matches the MAC address of a receiving network node.

25. The system of claim 24 wherein the OAM task is further configured to use the collected path information to determine an egress port.

26. A system for obtaining path information related to a bridged network comprising:
a hardware network node having:
multiple ports; and
an operations, administration, and maintenance (OAM) task configured to:
receive a layer 2 (L2) frame with a media access control (MAC) address in the header that triggers the collection of path information, the received L2 frame including a target MAC address in the payload; and
use the target MAC address in the payload to forward the received L2 frame in the bridged network, wherein using the target MAC address in the payload to forward the received L2 frame in the bridged network comprises using the target MAC address in the payload of the received L2 frame to determine from which of the multiple ports the received L2 frame will egress.

27. The system of claim 26 wherein the destination MAC address in the header of the received L2 frame is a multicast MAC address.

* * * * *